United States Patent
Patra et al.

(10) Patent No.: US 10,275,303 B2
(45) Date of Patent: Apr. 30, 2019

(54) MECHANISM FOR RUNNING DIAGNOSTIC RULES ACROSS MULTIPLE NODES

(71) Applicant: Oracle International Corporation, Redwood Shores, CA (US)

(72) Inventors: Lalatendu Patra, Bangalore (IN); Mridhula N. Shetty, Bangalore (IN); Rajiv Maheshwari, Redwood Shores, CA (US); Ashwin K. Karkala, Bangalore (IN); Sandeep Pandita, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 102 days.

(21) Appl. No.: 15/075,851

(22) Filed: Mar. 21, 2016

(65) Prior Publication Data

US 2017/0116061 A1    Apr. 27, 2017

Related U.S. Application Data

(60) Provisional application No. 62/245,939, filed on Oct. 23, 2015.

(51) Int. Cl.
*G06F 11/00*  (2006.01)
*G06F 11/07*  (2006.01)

(52) U.S. Cl.
CPC ........ *G06F 11/079* (2013.01); *G06F 11/0709* (2013.01); *G06F 11/0787* (2013.01)

(58) Field of Classification Search
CPC .................................................. G06F 11/079
See application file for complete search history.

(56) References Cited

U.S. PATENT DOCUMENTS

| | | | |
|---|---|---|---|
| 8,612,377 B2 | 12/2013 | Beg et al. | |
| 9,548,886 B2* | 1/2017 | Gates | G06F 11/0709 |
| 9,571,334 B2* | 2/2017 | Wessels | H04L 41/065 |
| 2004/0225927 A1* | 11/2004 | Warpenburg | G06F 11/0718 714/47.2 |
| 2015/0288558 A1* | 10/2015 | Gates | H04L 41/0686 714/57 |
| 2016/0218911 A1* | 7/2016 | Wessels | H04L 41/065 |
| 2016/0248658 A1* | 8/2016 | Patel | H04L 45/02 |
| 2017/0244781 A1* | 8/2017 | Walton | H04L 67/10 | cited by examiner

*Primary Examiner* — Christopher S McCarthy
(74) *Attorney, Agent, or Firm* — Invoke

(57) ABSTRACT

Techniques for running diagnostic rules across multiple nodes are disclosed. A root cause of an error occurring on a particular node is determined. A root cause of an error on the particular node is identified based on a metric corresponding to another node and/or based on a previously-reported error on another node. Additionally or alternatively, an error is predicted to occur on a particular node. The error is predicted based on a trend associated with a metric corresponding to another node.

40 Claims, 6 Drawing Sheets

MECHANISM FOR RUNNING DIAGNOSTIC RULES ACROSS MULTIPLE NODES

BENEFIT CLAIMS; INCORPORATION BY REFERENCE

This application claims the benefit of U.S. Provisional Patent Application 62/245,939, filed Oct. 23, 2015, which is hereby incorporated by reference.

TECHNICAL FIELD

The present disclosure relates to diagnosis of system errors. In particular, the present disclosure relates to a mechanism for running diagnostic rules across multiple nodes to identify candidate causes of errors.

BACKGROUND

Many computer systems include multiple hardware and/or software nodes. Examples of hardware nodes include a server, a Central Processing Unit (CPU), and a memory. Examples of software nodes include a database application, a user interface engine, and a security application. The nodes may span various tiers, such as a client tier, a web tier, an application tier, and a data tier.

An error may occur on one or more nodes of a computer system. An error occurring on one node may be caused by another error on another node.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1:
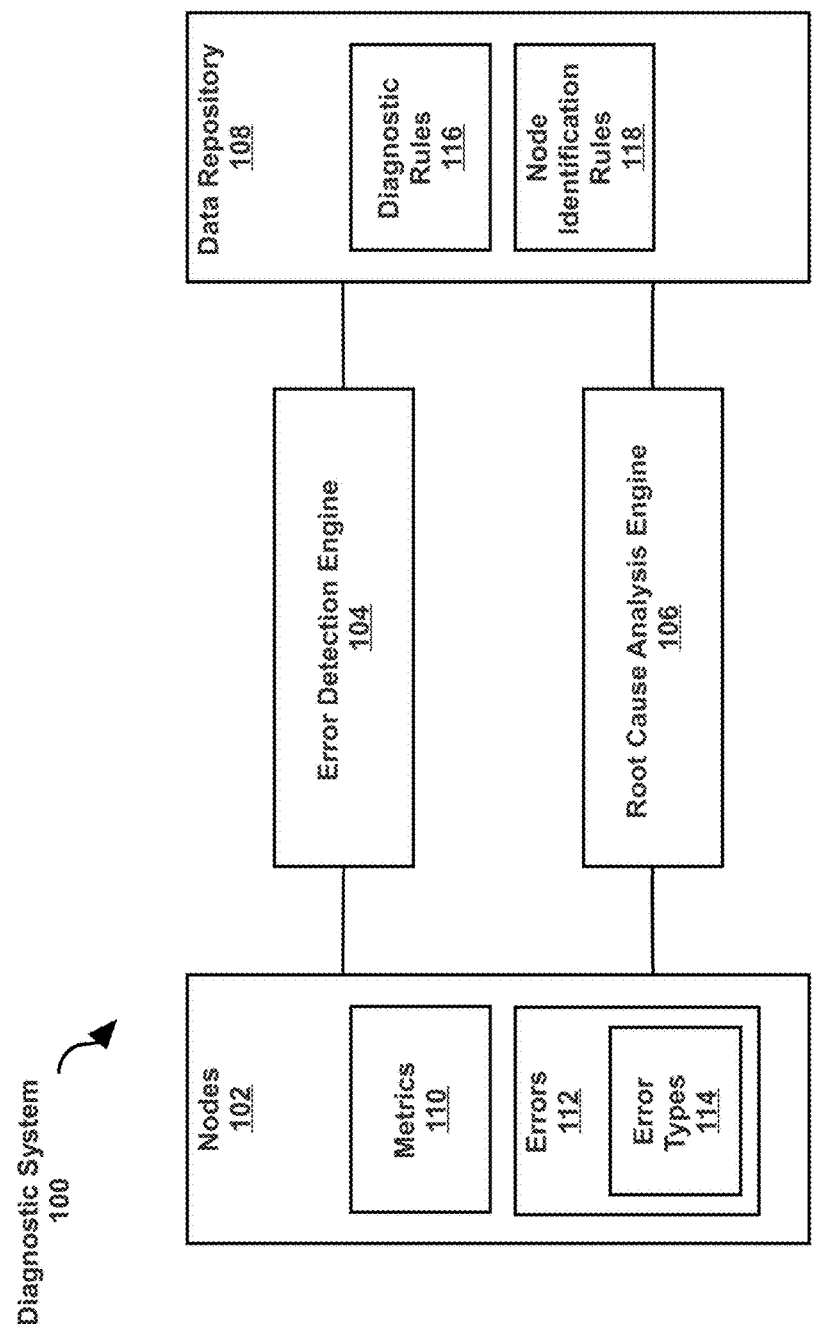
FIG. 1 illustrates a diagnostic system, in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. DIAGNOSTIC SYSTEM ARCHITECTURE
3. IDENTIFYING A ROOT CAUSE OF AN ERROR ON A PARTICULAR NODE BASED ON A METRIC CORRESPONDING TO ANOTHER NODE
4. IDENTIFYING A ROOT CAUSE OF AN ERROR ON A PARTICULAR NODE BASED ON A PREVIOUSLY-REPORTED ERROR ON ANOTHER NODE
5. PREDICTING AN ERROR ON A PARTICULAR NODE BASED ON A TREND ASSOCIATED WITH A METRIC CORRESPONDING TO ANOTHER NODE
6. EXAMPLE EMBODIMENT
7. MISCELLANEOUS; EXTENSIONS
8. HARDWARE OVERVIEW

1. General Overview

One or more embodiments include analyzing nodes of a target system to find a root cause of a particular error on a first node in the target system. The sequence in which the nodes are analyzed is determined based on rules associated with each node that is analyzed. A rule, associated with the first node, is identified. An error type of the particular error on the first node is applied to the rule to select a second node for analysis. If the analysis of the second node does not yield a root cause of the particular error, then another rule, associated with the second node, is identified. Based on the rule associated with the second node, a third node is selected for analysis. Accordingly, nodes of the target system are traversed based on rules associated with each node.

One or more embodiments include identifying a root cause of an initial error on a first node of a target system based on a metric corresponding to another node of the target system. A metric corresponding to a second node of the target system is determined. If the metric is associated with an error type of the initial error, then the second node is selected for diagnostic testing. If the diagnostic testing finds an additional error on the second node, then the additional error is identified as a root cause of the initial error.

One or more embodiments include identifying a root cause of a current error on a first node of a target system based on a previously-reported error on another node of the target system. A previously-reported error on a second node of the target system is determined. If an error type of the previously-reported error is associated with an error type of the current error, then the previously-reported error is identified as a root cause of the current error.

One or more embodiments include predicting an error on a particular node based on a trend associated with a metric corresponding to another node. A trend associated with a metric on a first node is determined. Based on the trend, a future value of the metric is predicted. If the future value of the metric would constitute an error, then a first error type of the error is determined. If a prior error of the first error type was previously found to be a root cause of another prior error of a second error type on a second node, then an error of the second error type is predicted to occur on the second node.

2. Diagnostic System Architecture

FIG. 1 illustrates a diagnostic system 100 in accordance with one or more embodiments. As illustrated in FIG. 1, diagnostic system 100 includes nodes 102, error detection engine 104, root cause analysis engine 106, and data repository 108. In one or more embodiments, diagnostic system 100 may include more or fewer components than the components illustrated in FIG. 1. The components illustrated in FIG. 1 may be local to or remote from each other. The components illustrated in FIG. 1 may be implemented in software and/or hardware and may be distributed over one or more applications and/or machines. Operations described with respect to one component may instead be performed by another component.

In one or more embodiments, a node 102 may be a hardware component and/or a software component of a target system. Examples of hardware nodes include a server, a Central Processing Unit (CPU), and a memory. Examples of software nodes include a database application, a user interface engine, and a security application. The nodes may span various tiers, such as a client tier, a web tier, an application tier, and a data tier.

A node 102 may be associated with a metric 110. A metric 110 is a measure related to a performance of the node 102. Examples of metrics include a usage of a central processing unit (CPU), a heap usage, a memory usage, a latency time, and a wait time in a queue. Metrics 110 may be determined on a periodic basis. Metrics 110 may be stored at data repository 108.

A node 102 may be associated with an error 112. An error 112 occurs when a node 102 fails to perform as expected. As an example, a node may be expected to return a particular result. If the node is unable to return the particular result, then an error occurs. The node may return an error message or an error code, which indicates that the error has occurred. As another example, a node may be expected to operate while maintaining a metric within a particular acceptable range. If the metric exceeds the acceptable range, then an error has occurred.

An error 112 detected on one node 102 may be caused by another error 112 on another node 102. A first error 112 on a first node 102 that is a cause of a second error 112 on a second node 102 is referred to herein as a "root cause" or "candidate cause" of the second error 112.

An error 112 may be associated with an error type 114. An error type 114 is a classification based on a common attribute associated with a group of errors 112. An error type 114 may be associated with a common resource from which errors 112 originate. For example, errors originating from database servers may be categorized as being associated with one error type. The error type would be a "database server" error type. Additional examples include a "CPU" error type, a "memory" error type, and an "application server" error type.

Additionally or alternatively, an error type 114 may be associated with a common manner in which errors 112 occur. As an example, a group of errors may be associated with a "latency" error type. Each error involves performing an operation using a duration that is longer than an acceptable range. As another example, a group of errors may be associated with an error type for "failure to issue a warning." Nodes may be configured to issue a warning when a particular value of a metric is reached. If a node fails to issue the warning even though the particular value has been reached, then a "failure to issue a warning" error occurs. Additional examples include an error type for "depletion of a resource," an error type for "failure to implement error avoidance functionality," and an error type for "failure to report an error."

Additionally or alternatively, an error type 114 may be associated with a common manner in which errors 112 are detected. For example, a group of errors may be self-reported. Nodes on which an error occurs may throw an exception or otherwise report the error. The errors may be associated with an error type for "self-reporting error."

The following example illustrates different error types 114. A target system may include three different database servers. Database server x may report a depletion of tablespace p. Database server y may report a depletion of tablespace q. Since these errors involve depletion of a resource, the errors would be associated with a "depletion" error type. The "depletion" error type is associated with a common attribute of the errors. Further, these errors originate from a same resource type, a tablespace. Therefore, the errors would be associated with a "tablespace" error type. The "tablespace" error type is associated with a common resource from which the errors originate.

In one or more embodiments, data repository 108 is any type of storage unit and/or device (e.g., a file system, database, collection of tables, or any other storage mechanism) for storing data. Further, data repository 108 may include multiple different storage units and/or devices. The multiple different storage units and/or devices may or may not be of the same type or located at the same physical site. Further, data repository 108 may be implemented or may execute on the same computing system as error detection engine 104 and/or root cause analysis engine 106. Alternatively or additionally, data repository 108 may be implemented or executed on a computing system separate from error detection engine 104 and/or root cause analysis engine 106. Data repository 108 may be communicatively coupled to error detection engine 104 and/or root cause analysis engine 106 via a direct connection or via a network.

Data sets describing diagnostic rules 116 and node identification rules 118 may be implemented across any of components within diagnostic system 100. However, this information is illustrated within data repository 108 for purposes of clarity and explanation.

In one or more embodiments, a diagnostic rule 116 is used for diagnosing a node 102 to identify an error 112 on the node 102. As an example, a diagnostic rule 116 may aggregate metrics 110 over a particular time period. The diagnostic rule 116 may determine whether the aggregated metrics 110 satisfy a particular criterion.

Diagnostic rules 116 may be associated with nodes 102 and/or error types 114. A diagnostic rule 116 is executed on a particular node 102 if the diagnostic rule 116 is associated with the particular node 102. Additionally or alternatively, a diagnostic rule 116 is executed if the diagnostic rule 116 is associated with an error type 114 of an error 112 that has been detected.

Different diagnostic rules 116 may accept different metrics 110 as input, and/or perform different operations on the input. For example, a diagnostic rule 116 associated with a particular node 102 may involve performing a particular operation on a particular metric 110. Another diagnostic rule 116 associated with a different node 102 may involve performing a different operation on a different metric 110.

In one or more embodiments, a node identification rule 118 is used for identifying additional nodes 102 for analysis in order to determine a root cause of a particular error 112 on a particular node 102. As an example, if an error has been detected on a particular node, then a node identification rule may identify a host of the particular node as the next node for analysis. The sequence in which the nodes 102 of a target system are analyzed during a root cause analysis is determined based on node identification rules 118.

Node identification rules 118 may be associated with nodes 102. A node identification rule 118 is executed to identify an additional node for analysis, after analyzing a particular node 102, if the node identification rule 118 is associated with the particular node 102. Different node identification rules may identify different sequences of nodes for analysis.

In one or more embodiments, error detection engine 104 refers to hardware and/or software configured to perform operations for detecting an error 112 on a node 102. Examples of operations for detecting an error 112 on a node 102 are described below with reference to FIGS. 2 and 3.

In one or more embodiments, root cause analysis engine 106 refers to hardware and/or software configured to perform operations described herein for root cause analysis. Examples of operations for identifying a root cause of an error on a first node based on a metric corresponding to another node are described below with reference to FIG. 2. Examples of operations for identifying a root cause of an error on a first node based on a previously-reported error on another node are described below with reference to FIG. 3. Examples of operations for predicting an error on a first node based on a trend associated with a metric corresponding to a second node are described below with reference to FIG. 4.

In an embodiment, error detection engine 104 and/or root cause analysis engine 106 is implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a mainframe, a television, a content receiver, a set-top box, a printer, a mobile handset, a smartphone, and/or a personal digital assistant ("PDA").

Figure 2:
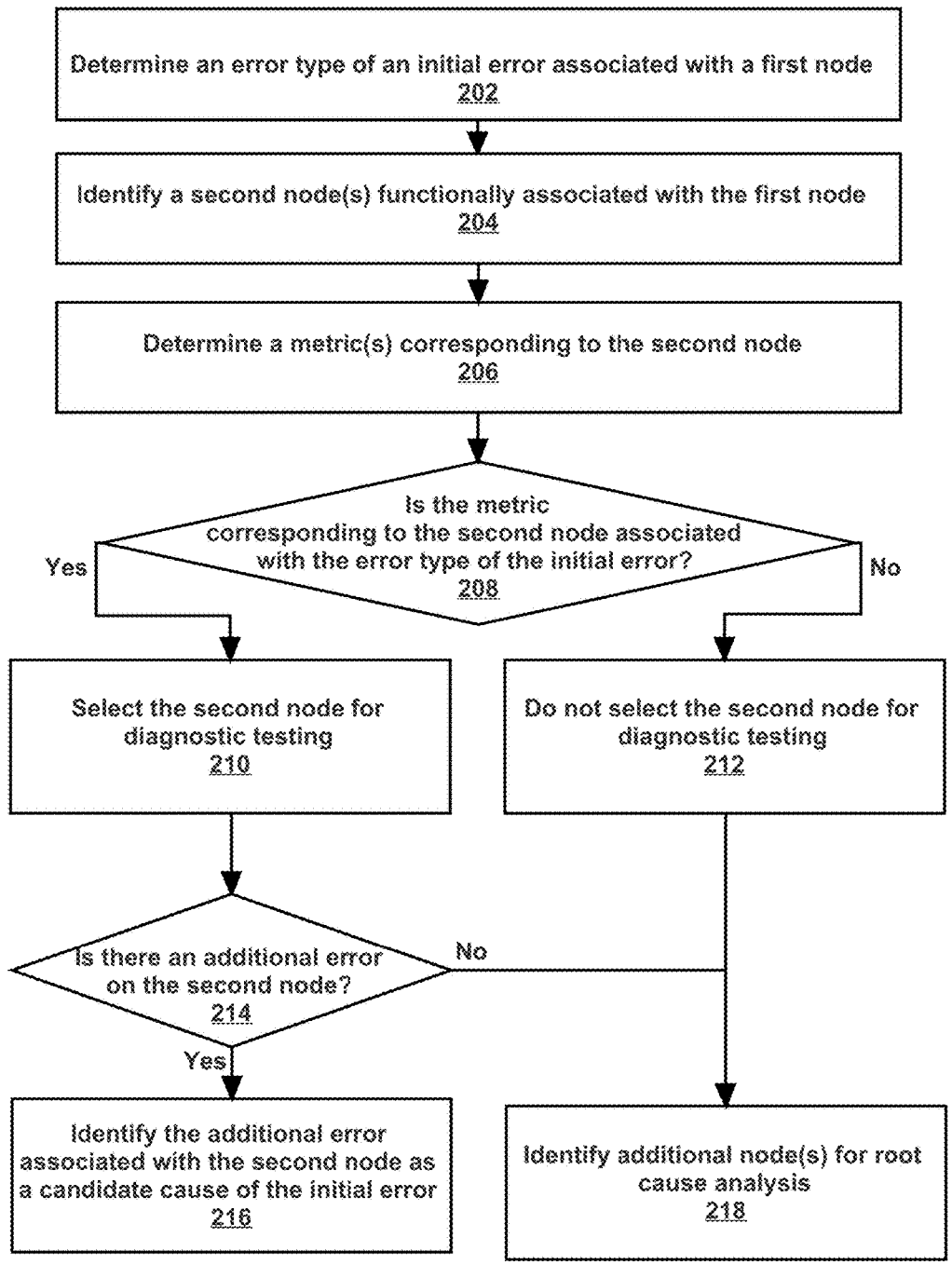
FIG. 2 illustrates an example set of operations for identifying a root cause of an error on a particular node based on a metric corresponding to another node, in accordance with one or more embodiments.

3. Identifying a Root Cause of an Error on a Particular Node Based on a Metric Corresponding to Another Node FIG. 2 illustrates an example set of operations for identifying a root cause of an initial error on a first node based on a metric corresponding to a second node, in accordance with one or more embodiments. One or more operations illustrated in FIG. 2 may be modified, rearranged, or omitted all together. Accordingly, the particular sequence of operations illustrated in FIG. 2 should not be construed as limiting the scope of one or more embodiments.

In an embodiment, an initial error may be identified by a user, the first node itself, and/or an application associated with the first node (such as, an error detection engine). As an example, a user may notice a latency in an operation of a particular node. The user may enter the latency as an error associated with the particular node via a user interface. The error is identified as an initial error for which root cause analysis to be performed.

As another example, a particular node may execute certain operations that result in an error. The particular node may report an error code associated with the error. The error is identified as an initial error for which root cause analysis to be performed.

As another example, an application may periodically perform a performance check on a particular node. The performance check may identify an error on the particular node. The error is identified as an initial error for which root cause analysis to be performed.

One or more embodiments include determining an error type of an initial error associated with a first node (Operation 202). A mapping between error types and errors is retrieved from a data repository. The mapping may be stored in any form, such as a table, an index, or a set of logic statements. Based on the mapping, the initial error is mapped to a corresponding error type.

As an example, a disk drive may report that an available storage space has fallen below a threshold value required by a particular criterion. A mapping may indicate that failure to satisfy the particular criterion corresponds to an error type, "hardware storage space."

As another example, a security application may return an error code, "x03yz." A mapping may indicate that the error code corresponds to an error type, "authentication."

One or more embodiments include identifying a second node(s) functionally associated with the first node (Operation 204). The second node may be identified based on a topology graph, a set of runtime dependencies, and/or a set of rules associated with the first node.

A topology graph describes an overall architecture, arrangement, setting, and/or usage of nodes of a target system. The topology graph may show that one node is "connected to" another node, indicating that the two nodes have a relationship with each other. As an example, a target system may include a server that implements multiple applications. A topology graph for the target system would indicate that the server is "connected to" each of the applications. If one node is "connected to" another node in a topology graph, then the two nodes are determined to be functionally associated with each other.

Additionally or alternatively, runtime dependencies indicate whether particular nodes are in communication with each other during a particular runtime time period. The particular runtime period may be a period of time in which the first error occurred. Alternatively, the particular runtime period may be a period of time in which the first error was detected and/or determined. If one node has a runtime dependency on another node, then the two nodes are determined to be functionally associated with each other.

Additionally or alternatively, rules associated with each node of the target system are stored in a data repository. The rules associated with the nodes of the target system may be stored in a table, which is indexed based on the nodes. Alternatively, the rules of a particular node may be stored with the particular node. As an example, the rules of a particular node may be stored as a flag and/or metadata associated with the particular node.

A set of rules associated with the first node is retrieved from the data repository. The set of rules associated with the first node identifies one or more nodes that are functionally associated with the first node. The nodes functionally associated with the first node are additional nodes to be analyzed for identifying a candidate cause of the initial error occurring on the first node.

The set of rules associated with the first node indicates that different nodes are to be analyzed based on different error types of the initial error on the first node. For example, a set of rules associated with a web server may indicate that a database server is to be analyzed if a "latency" type of error occurs on the web server. The set of rules associated with the web server may further indicate that a particular application is to be analyzed if an "out of memory" type of error occurs on the web server.

In an embodiment, a topology graph, runtime dependencies, and/or a set of rules associated with the first node are combined to determine a second node functionally associated with the first node. The set of rules may indicate a sequence in which nodes of a topology graph are traversed. As an example, a topology graph may indicate that a first node is connected to a second node and a third node. A set of rules may indicate that either the second node or the third node is to be analyzed based on an error type of an initial error on the first node. If the initial error is of a first error type (such as "empty data set"), then the set of rules may indicate that the second node (such as a database node) is to be analyzed. If the initial error is of a second error type (such as "user interface skew"), then the set of rules may indicate that the third node (such as a web component node) is to be analyzed.

One or more embodiments include determining a metric (s) corresponding to the second node (Operation 206). The metric associated with the second node is determined using a background process associated with the second node. The background process may be periodically performed to monitor the metric. Historical values of the metric may be stored in a data repository. Values of the metric that have been detected and/or stored during a period of time that is associated with the first error are also referred to herein as being "available." As an example, a background process may determine a CPU usage of an application once per hour. A data repository may store the hourly CPU usage over a particular time period (such as that past 30 days). The CPU usage over the particular time period is said to be "available."

One or more embodiments include determining whether the metric corresponding to the second node is associated with the error type of the initial error (Operation 208). A candidate analytical mapping is retrieved from a data repository. The candidate analytical mapping is stored separately from the values of the metrics of the second node, which were determined at Operation 206. The candidate analytical mapping may have been determined prior to determining the metric corresponding to the second node at Operation 206. The candidate analytical mapping maps (a) one or more error types of errors occurring on a particular node to (b) one or more metrics corresponding to another particular node.

The candidate analytical mapping was previously determined based on a likelihood that a root cause of an error of a particular error type on one node is found on another node for which a value for a particular metric is available. If an error of a particular error type is occurring on a particular node, and there is a high likelihood that the root cause of the error is on an additional node for which a value for a particular metric is available, then there is a candidate analytical mapping between the particular error type corresponding to the particular node and the particular metric corresponding to the additional node. The candidate analytical mapping may also be referred to herein as an "association" between the particular error type and the particular metric. The particular metric corresponding to the additional node is said to be "associated with" the particular error type corresponding to the particular node.

A candidate analytical mapping may have been specified by a user (such as an administrator) via a user interface. Additionally or alternatively, a candidate analytical mapping may have been heuristically determined based on historical data. As an example, errors and metrics corresponding to nodes of a target system may be monitored over a historical time period (such as the past 30 days). A correlation value may be found between (a) errors of a particular error type found on a first node and (b) errors occurring on a second node, for which a value for a particular metric is available, that are a root cause of the errors of the particular error type on the first node. If the correlation value is above a threshold value, then an association may be found between the particular error type and the particular metric. The association may be stored as a candidate analytical mapping. The candidate analytical mapping indicates that the second node is to be analyzed for identifying a candidate cause of errors of the particular error type on the first node.

As described above, a candidate analytical mapping maps (a) one or more error types of errors occurring on a particular node to (b) one or more metrics corresponding to another particular node. A mapping between (a) a particular error type corresponding to a particular node and (b) a particular metric corresponding to an additional node indicates that, if a value for the particular metric is available for the additional node, then the additional node is to be analyzed for identifying a candidate cause of the error of the particular error type on the particular node.

In an embodiment, a candidate analytical mapping maps an error type of an error on a particular node to a metric corresponding to another particular node conditional upon a range of values for the particular metric. Based on the condition, the mapping is valid if the metric corresponding to the other node is within the range of values. As an example, a candidate analytical mapping may provide that a value of a CPU usage on one node is associated with an error of a particular error type on another node, only if the value of the CPU usage is between 10% and 20%.

A look-up of the candidate analytical mapping is performed to determine whether the metric corresponding to the second node, determined at Operation 206, is associated with the error type of the initial error on the first node. A candidate analytical mapping may indicate that an association exists between the metric corresponding to the second node and the error type of the initial error on the first node if the value for the metric corresponding to the second node is within a particular range. The value for the metric corresponding to the second node is compared to the particular range. If the value for the metric corresponding to the second node is within the particular range, then the metric corresponding to the second node is determined to be associated with the error type of the initial error.

As an example, an initial error on a first node may be of the error type, "database server." A candidate analytical mapping may be retrieved from a data repository. The candidate analytical mapping may indicate that a CPU usage of 1.5% or more, on a database server node, is associated with "database server" errors on the first node. A current CPU usage of the database server node may be determined to be 2.0%. Since the current CPU usage (2.0%) is greater than the threshold value (1.5%) specified in the candidate analytical mapping, the CPU usage metric would be determined as being associated with the error type "database server."

In one or more embodiments, if the metric corresponding to the second node is not associated with the error type of the initial error, then the second node is not selected for diagnostic testing (Operation 212). Alternatively, if the metric corresponding to the second node is associated with the error type of the initial error, then the second node is selected for diagnostic testing (Operation 210).

One or more embodiments include determining whether there is an additional error on the second node based on diagnostic testing (Operation 214). One or more diagnostic rules associated with the second node are retrieved from a data repository. The diagnostic rules are executed on the second node.

A diagnostic rule may aggregate metrics, corresponding to the second node, over a particular time period. The metrics may have been previously determined by a background process and stored in a data repository. The diagnostic rule determines whether the aggregated metrics satisfy a particular criterion. If the particular criterion is not satisfied, then an error is determined on the second node.

As an example, a diagnostic rule may compute an average of memory usage over a time period. The hourly memory usage over the time period may be 10%, 11%, and 12%. The average memory usage is determined as 11%. If the average memory usage is above a specified threshold value, then an error is identified.

As another example, a diagnostic rule may determine a trend or a rate of change of a metric over a time period. If the rate at which the metric is changing is greater than a specified threshold value, then an error may be identified.

As another example, a node of a target system may be a Java Virtual Machine (JVM). A diagnostic rule may determine that a JVM heap usage of the JVM node has remained within a particular range of the maximum value over a particular time period. The diagnostic rule may determine that the particular time period is greater than a specified threshold value. The JVM heap usage may have remained at such a high level because the maximum heap configuration was not appropriately set for the JVM node. The diagnostic rule may identify the maximum heap configuration setting as an error on the node.

As another example, a node of a target system may be a web server. A diagnostic rule may determine the percentage of requests that have a response time greater than a threshold value (for example, three seconds). If the percentage is greater than a specified threshold value (for example, 20%), then an error may be identified.

One or more embodiments include identifying the additional error associated with the second node as a candidate cause of the initial error (Operation 216). The additional error is presented as a root cause to a user via a user interface. If multiple errors associated with multiple nodes are identified through diagnostic testing, then each error may be identified as a candidate cause of the initial error.

In an embodiment, a task or action is presented and/or executed to correct the initial error on the first node based on the additional error on the second node. The task is identified from a table, or other data structure, that maps corrective actions to root causes. As an example, an initial error may be a failure to respond by a particular server. A root cause of the initial error may be determined to be a configuration setting of a database, which established a particular maximum bandwidth for the database. A table mapping corrective actions to root causes may be retrieved from a data repository. The table may indicate that a task for correcting the initial error is to modify the maximum bandwidth for the database.

If analysis of the second node does not yield a root cause of the initial error on the first node, then additional node(s) are identified for root cause analysis (Operation 218). An additional node is identified based on a topology graph, runtime dependencies, and/or a set of rules associated with the second node. The set of rules associated with the second node identify an additional node for analysis based on the error type of the initial error on the first node, as described above with respect to Operation 204.

Figure 3:
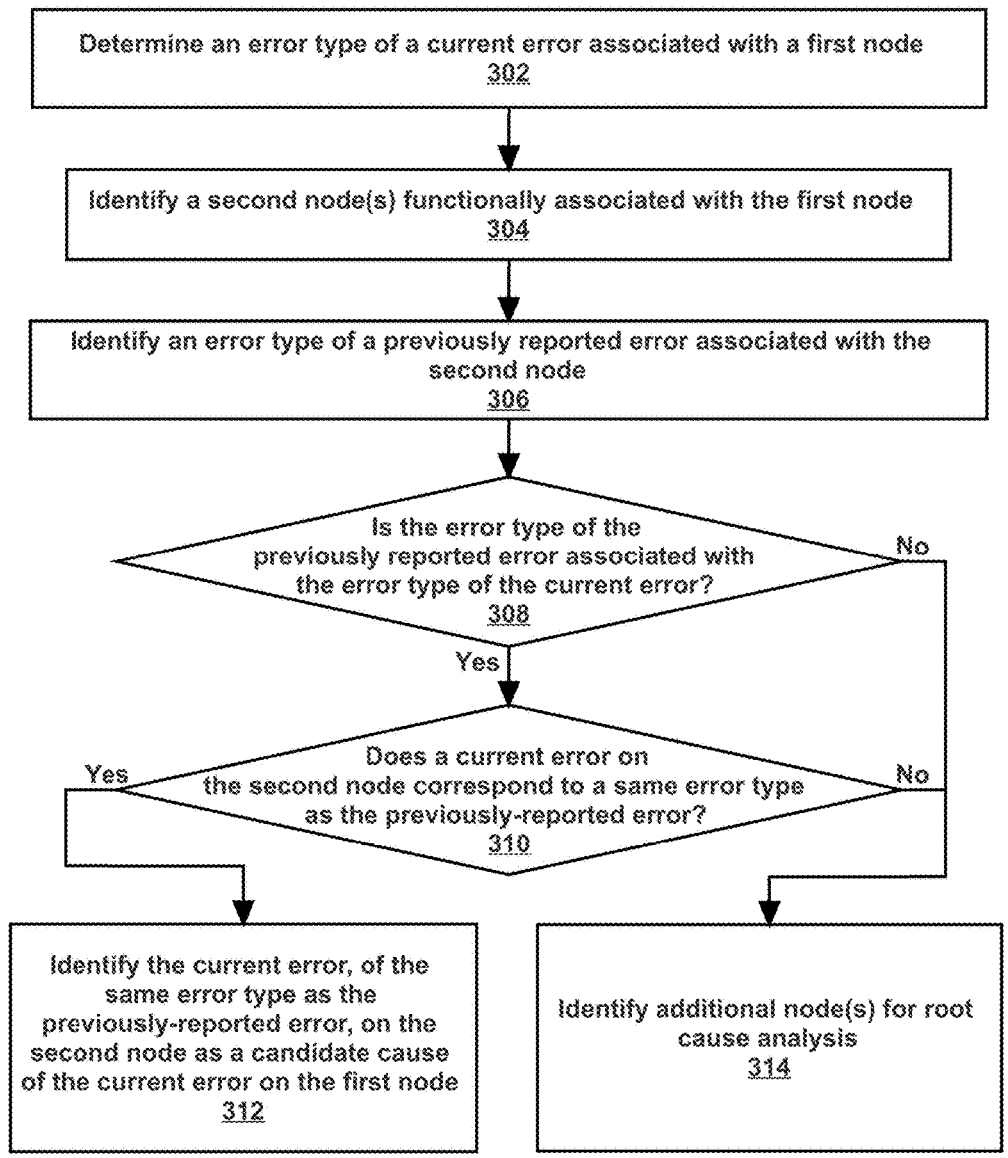
FIG. 3 illustrates an example set of operations for identifying a root cause of an error on a particular node based on a previously-reported error on another node, in accordance with one or more embodiments.

4. Identifying a Root Cause of an Error on a Particular Node Based on a Previously-Reported Error on Another Node FIG. 3 illustrates an example set of operations for identifying a root cause of a current error on a first node based on a previously-reported error on a second node, in accordance with one or more embodiments. One or more operations illustrated in FIG. 3 may be modified, rearranged, or omitted all together. Accordingly, the particular sequence of operations illustrated in FIG. 3 should not be construed as limiting the scope of one or more embodiments.

In an embodiment, as described above with reference to FIG. 2, the current error may be identified by a user, the first node itself, and/or an application associated with the first node (such as, an error detection engine). After the current error is detected, a root cause analysis is performed to identify a root cause of the current error.

One or more embodiments include determining an error type of a current error associated with a first node (Operation 302). The error type is determined based on a mapping stored in a data repository, as described above with reference to Operation 202 of FIG. 2.

One or more embodiments include determining a second node(s) functionally associated with the first node (Operation 304). The second node may be identified based on a topology graph, a set of runtime dependencies, and/or a set of rules associated with the first node. The set of rules associated with the first node identify the second node for analysis based on the error type of the current error on the first node, as described above with respect to Operation 204 of FIG. 2.

One or more embodiments include identifying an error type of a previously-reported error associated with the second node (Operation 306). Previously-reported errors associated with the second node are retrieved from a data repository. The previously-reported errors are identified by a background process and/or a diagnostic rule during a previous time period.

During a previous time period, a background process may be periodically performed to monitor a metric of a node, as described above with reference to Operation 206 of FIG. 2. If the metric exceeds a specified threshold, then an error may be identified. The error is stored as a previously-reported error in the data repository.

Additionally or alternatively, during a previous time period, a diagnostic rule may be executed on a node, as described above with reference to Operation 214 of FIG. 2. The diagnostic process may identify an error on the node. The error is stored as a previously-reported error in the data repository.

One or more embodiments include determining whether the error type of the previously-reported error is associated with the error type of the current error (Operation 308). Associations between error types of errors of different nodes are retrieved from a data repository. The associations may have been previously specified by a user (such as an administrator) via a user interface. If the stored associations include an association between the error type of the previously-reported error and the error type of the current error, then the error type of the previously-reported error is associated with the error type of the current error.

Additionally or alternatively, the error type of the previously-reported error and the error type of the current error are compared to historical data. Based on the historical data, a correlation value may be found between (a) the error type of the previously-reported error and (b) the error type of the current error. A higher correlation value indicates a higher tendency for errors of the same error type as the previously-reported error to cause errors of the same error type as the current error. If the correlation value is above a threshold value, then the error type of the previously-reported error is associated with the error type of the current error.

One or more embodiments include determining whether a current error on the second node corresponds to a same error type as the previously-reported error on the second node (Operation 310). A current error on the second node may be determined based on a metric of the second node and/or a diagnostic rule executed on the second node.

A current metric of the second node is determined, as described above with reference to Operation 206 of FIG. 2. If the current metric exceeds an acceptable range, then a current error is found on the second node. An error type of the current error on the second node is determined, as described above with reference to Operation 202 of FIG. 2. The error type of the current error on the second node is compared to the error type of the previously-reported error to determine whether the error types are the same.

Additionally or alternatively, a diagnostic rule is executed on the second node. The diagnostic rule may find a current error on the second node. An error type of the current error on the second node is determined, as described above with reference to Operation 202 of FIG. 2. The error type of the current error on the second node is compared to the error type of the previously-reported error to determine whether the error types are the same.

One or more embodiments include identifying the current error, of the same error type as the previously-reported error, as a candidate cause of the current error on the first node (Operation 312). The current error on the second node is presented as a root cause to a user via a user interface, as described above with reference to Operation 216 of FIG. 2. Additionally or alternatively, a task or action is presented and/or executed to correct the current error on the first node based on the current error on the second node.

In an embodiment, a particular set of diagnostic rules are not executed in identifying a candidate cause of the current error on the first node. The particular set of diagnostic rules includes diagnostic rules that were previously applied and did not result in identification of any reported errors of an error type that is associated with the error type of the current error.

As an example, at a prior time period, a first error of a "latency" error type is detected on a first node. A first diagnostic rule is executed on a second node. The first diagnostic rule does not return any errors on the second node. A second diagnostic rule is executed on a third node. The second diagnostic rule identifies an error on the third node. The error on the third node is identified as a root cause of the first error. The error on the third node is associated with a "database server" error type.

Continuing the example, at a current time period, a fourth error of a "latency" error type is detected on the first node. The second diagnostic rule is not executed on the second node. The second diagnostic rule is not executed because the second diagnostic rule did not previously result in identification of any error of an error type that is associated with the "latency" error type. In contrast, the third diagnostic rule is executed on the third node. The third diagnostic rule is executed to determine whether an error of the "database server" error type is currently found on the third node. If a current error of the "database server" error type is found on the third node, then the current error on the third node is identified as a root cause of the fourth error on the first node.

If analysis of the second node does not yield a root cause of the current error on the first node, then additional node(s) are identified for root cause analysis (Operation 314). An additional node is identified based on a topology graph, runtime dependencies, and/or a set of rules associated with the second node. The set of rules associated with the second node identify an additional node for analysis based on the error type of the current error on the first node, as described above with respect to Operation 204.

Figure 4:
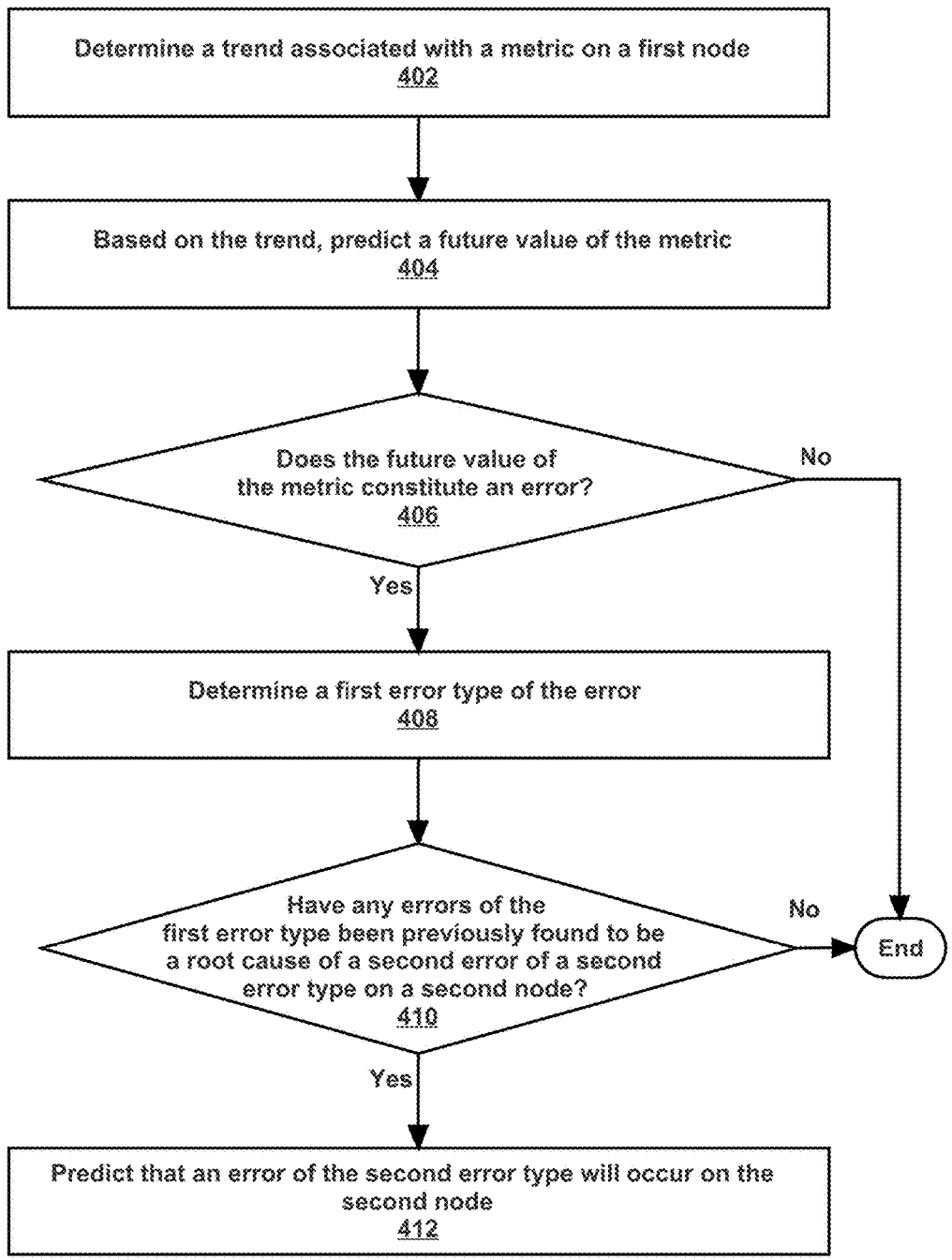
FIG. 4 illustrates an example set of operations for predicting an error on a particular node based on a trend associated with a metric corresponding to another node, in accordance with one or more embodiments.

5. Predicting an Error on a Particular Node Based on a Trend Associated with a Metric Corresponding to Another Node FIG. 4 illustrates an example set of operations for predicting an error on a particular node based on a trend associated with a metric corresponding to another node, in accordance with one or more embodiments. One or more operations illustrated in FIG. 4 may be modified, rearranged, or omitted all together. Accordingly, the particular sequence of operations illustrated in FIG. 4 should not be construed as limiting the scope of one or more embodiments.

One or more embodiments include determining a trend associated with a metric on a first node (Operation 402). The metric associated with the first node is determined using a background process associated with the first node, as described above with reference to Operation 206 of FIG. 2. Values of the metric over a particular time period are determined.

A trend associated with the values of the metric on the first node over the particular time period is determined. The trend may be a rate of change of the values of the metric over the particular time period. Additionally or alternatively, the trend may be represented by a particular function that models the values of the metric over the particular time period.

One or more embodiments include predicting a future value of the metric based on the trend (Operation 404). The future value of the metric is extrapolated by assuming that the metric will follow a same trend over a future time period.

As an example, a memory usage metric of a first node may be collected and/or determined every five minutes. Using appropriate statistical trending algorithms, the growth rate of the particular metric is determined. By analyzing the data over a particular time period (for example, the past one hour), the growth rate may be determined to be, for example, an increase of 2% per minute. Memory usage at the end of the particular time period may be determined as 70%. During a prior time period, a maximum value for the memory usage metric may have been determined as 90%.

Continuing the example, with a growth rate of 2% per minute, the system is expected to breach the maximum value of 90% in the next ten minutes (i.e. 90%−70%/2=10).

One or more embodiments include determining whether the future value of the metric constitutes an error (Operation 406). An acceptable range of the metric is retrieved from a data repository. If the future value of the metric exceeds the acceptable range, then an error would be found on the first node.

One or more embodiments include determining a first error type of the error that is predicted to occur on the first node (Operation 408). The first error type of the error that would occur on the first node is determined, as described above with reference to Operation 202 of FIG. 2.

One or more embodiments include determining whether any errors of the first error type were previously found to be a root cause of a second error of a second error type on a second node (Operation 410). Errors that were previously found to be a root cause of another error are retrieved from a data repository. Error types of the errors that previously found are identified. If a particular error that was previously found is of the first error type, then an additional error that was caused by the particular error is identified. The error type of the additional error that was caused by the particular error, and the node on which the additional error occurred, are also identified.

One or more embodiments include predicting that an error of the second error type will occur on the second node (Operation 412). The second error type is presented as an error type of an error that is predicted to occur via a user interface. Additionally or alternatively, a task or action is presented and/or executed to prevent an error of the second error type from occurring on the second node.

6. Example Embodiment

A detailed example is described below for purposes of clarity. Components and/or operations described below should be understood as one specific example which may not be applicable to certain embodiments. Accordingly, components and/or operations described below should not be construed as limiting the scope of any of the claims.

Figure 5:
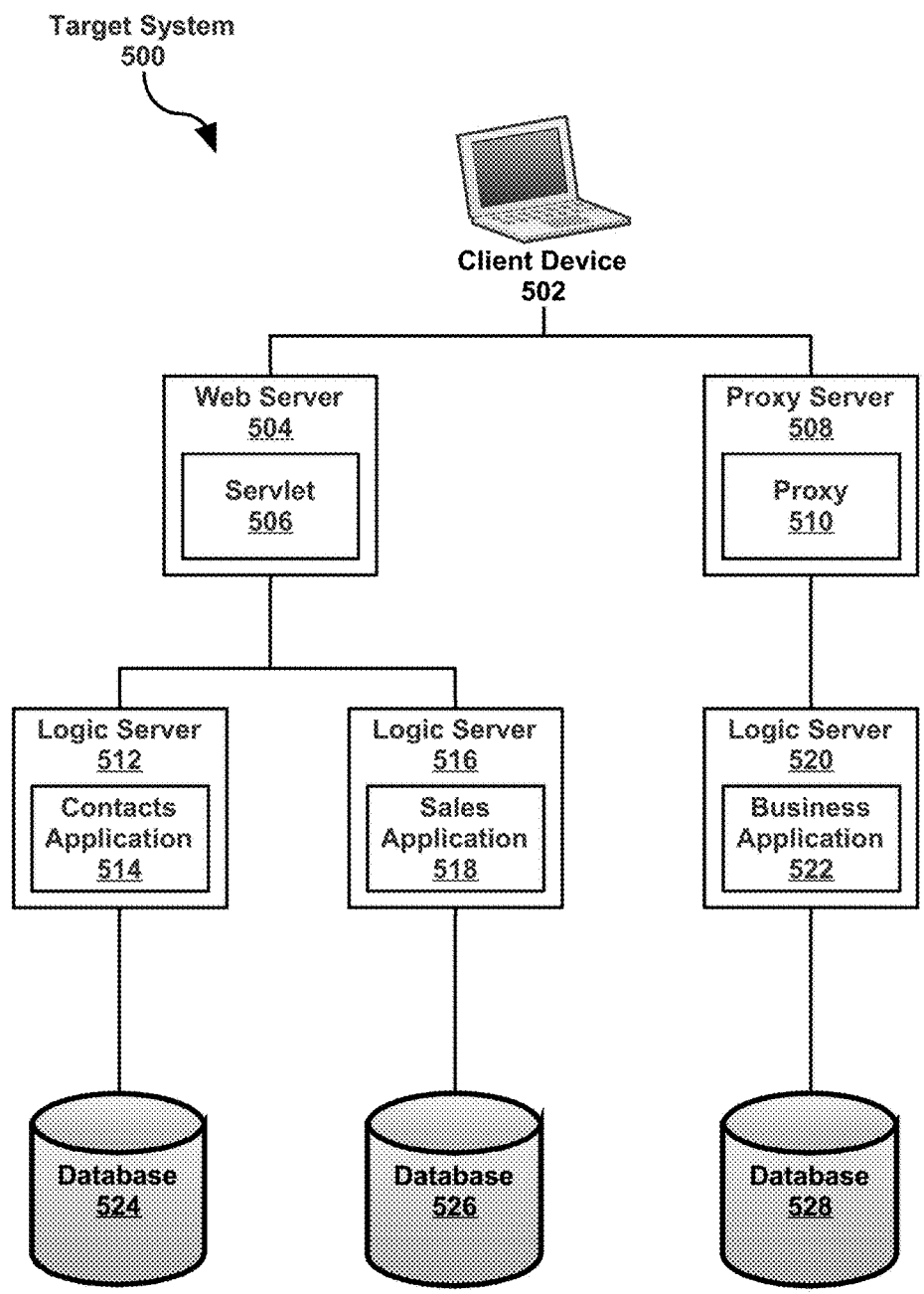
FIG. 5 illustrates an example for identifying a root cause of an error on a particular node, in accordance with one or more embodiments.

FIG. 5 illustrates an example for identifying a root cause of an error on a particular node, in accordance with one or more embodiments. As illustrated, target system 500 includes client device 502, web server 504, servlet 506, proxy server 508, proxy 510, logic server 512, contacts application 514, logic server 516, sales application 518, logic server 520, business application 522, database 524, database 526, and database 528.

Client device 502 determines that a result returned from contacts application 514 is empty. Client device 502 reports an error. Since the error originates from contacts application 514, the error is determined to be of the error type "contacts application."

Node identification rules associated with client device 502 are retrieved from a data repository. The node identification rules identify web server 504, servlet 506, proxy server 508, and proxy 510 as nodes that have a relationship with client device 502. Based on the "contact application" error type of the error on client device 502, the node identification rules select web server 504 and servlet 506 for further analysis.

Previously-reported errors of servlet 506 are identified. The previously-reported errors were determined based on a previous application of diagnostic rules. The previously-reported errors were stored in a data repository.

Historical data associated with servlet 506 and client device 502 is analyzed. Correlation values between (a) error types of any previously-reported errors on servlet 506 and (b) "contacts application" errors on client device 502 are determined based on the historical data. None of the correlation values are above a specified threshold value. None of the previously-reported errors on servlet 506 have a sufficient tendency to cause "contacts application" errors on client device 502. Therefore, none of the previously-reported errors of servlet 506 are associated with "contacts application" errors on client device 502. Diagnostic testing of servlet 506 is not performed.

Previously-reported errors of web server 504 are identified. The previously-reported errors were determined based on a previous application of diagnostic rules. For example, a diagnostic rule aggregated the memory usage of web server 504 over a 24-hour time period. The average memory usage over the 24-hour time period was 60%. Since the average memory usage of 60% was above a specified threshold value, the diagnostic rule identified an error. The error was stored as a previously-reported error of web server 504 in the data repository. The error is of the error type "memory."

Historical data associated with web server 504 and client device 502 is analyzed. A correlation value between (a) "memory" errors on web server 504 and (b) "contacts application" errors on client device 502 are determined based on the historical data. Since the correlation value is above a specified threshold value, memory" errors on web server 504 are determined to be associated with "contacts application" errors on client device 502.

Diagnostic testing of web server 504 is performed to determine whether a current error of a "memory" error type is found on web server 504. The diagnostic rule that found the previous "memory" error on web server 504 is executed. The diagnostic rule finds that the average memory usage over the past 24-hour time period is 30%. The average memory usage over the past 24-hour time period is below the specified threshold value. Therefore, the diagnostic rule does not find a current "memory" error on web server 504.

Additional nodes of target system 500 are selected for analysis. Node identification rules associated with web server 504 are retrieved from a data repository. The node identification rules identify logic server 512 and contacts application 514 as nodes that have a relationship with web server 504. Based on the "contacts application" error type of the error on client device 502, the node identification rules select contacts application 514 for further analysis.

A CPU usage corresponding to contacts application 514 is determined to be 10%. A particular criterion, stored in a data repository, indicates that a CPU usage on contacts application 514 that is above 8% is associated with a "contacts application" error type.

The particular criterion is determined based on historical data. A correlation value between a CPU usage on contacts application 514 and a "contacts application" error type on client device 502 is determined based on the historical data. Since the correlation value is above a specified threshold value when the CPU usage is above 8%, a CPU usage above 8% is associated with a "contacts application" error type.

Based on the particular criterion, a CPU usage of 10% on contacts application 514 is associated with a "contacts application" error type on client device 502. Therefore, contacts application 514 is selected for diagnostic testing.

A diagnostic rule is executed on contacts application 514. A diagnostic rule aggregates a heap usage of contacts application 514 over a particular time period. The diagnostic rule determines that the heap usage has remained within a particular range of the maximum value over the particular time period. The diagnostic rule determines that the heap usage has remained at such a high level due to a particular configuration setting of contacts application 514.

The particular configuration setting of contacts application 514 is determined as a root cause of the "contacts application" error detected on client device 502. The particular configuration setting of contacts application 514 is presented as a root cause at a user interface. In addition, the particular configuration setting is modified to increase a maximum allowed heap usage on contacts application 514.

7. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

8. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
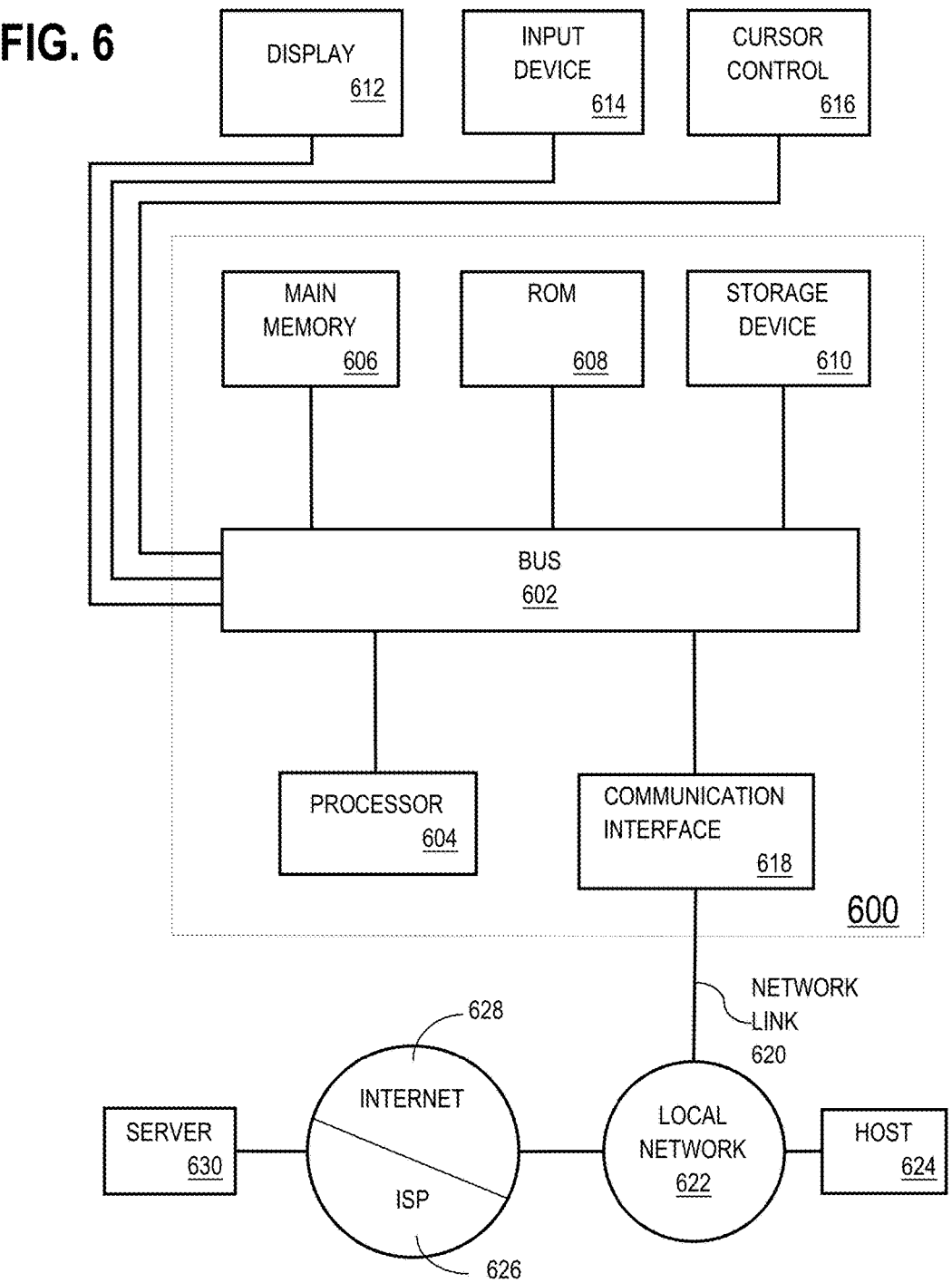
FIG. 6 shows a block diagram that illustrates a computer system in accordance with one or more embodiments.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, causes performance of operations comprising:
    identifying a first error, of a first error type, associated with a first node;
    determining a second node, from a plurality of nodes, such that:
        (a) the second node is functionally associated with the first node;
        (b) one or more values of a particular metric for the second node are available;
        (c) a separately stored candidate analytical mapping maps the particular metric to the first error type;
    responsive to the determining operation: analyzing the second node to determine a second error associated with the second node, wherein the second error corresponds to another metric different than the particular metric; and
    identifying the second error associated with the second node as a candidate cause of the first error;
    in response to a request for information associated with the first error: retrieving information indicating that the second error is the candidate cause of the first error.

2. The medium of claim 1, wherein the separately stored candidate analytic mapping maps the particular metric to the first error type conditional upon a range of values for the particular metric.

3. The medium of claim 1, wherein the operations further comprise:
    determining that the separately stored candidate analytical mapping does not map any metric that is available for a third node to the first error type; and
    refraining from analyzing the third node to determine a third error associated with the third node.

4. The medium of claim 1, wherein analyzing the second node comprises executing a diagnostic rule associated with the second node that identifies the second error.

5. The medium of claim 1, wherein the operations further comprise:
    prior to determining the second node from the plurality of nodes:
        determining that the first node is in communication with each of a set of nodes, from the plurality of nodes, during a period of time associated with the first error; and
        determining that the set of nodes is functionally associated with the first node, the set of nodes including the second node.

6. The medium of claim 1, wherein the operations further comprise:
    prior to determining the second node from the plurality of nodes:
        determining that a set of nodes, from the plurality of nodes, is functionally associated with the first node based on a topology graph, wherein the set of nodes includes the second node.

7. The medium of claim 1, wherein the operations further comprise:
    prior to determining the second node from the plurality of nodes:
        determining that a set of nodes, from the plurality of nodes, is functionally associated with the first node based on a set of rules associated with the first node, wherein the set of nodes includes the second node.

8. The medium of claim 1, wherein the operations further comprise presenting or executing a task to correct the first error based on the second error.

9. The medium of claim 1, wherein the first error is identified during performance of a periodic check of the first node.

10. The medium of claim 1, wherein the particular metric for the second node is monitored by a background process.

11. A non-transitory computer readable medium comprising instructions which, when executed by one or more hardware processors, causes performance of operations comprising:
    identifying a first error, of a first error type, associated with a first node;
    identifying a set of nodes, from a plurality of nodes, functionally associated with the first node;

determining a previously reported error corresponding to a second node of the set of nodes;

determining that the previously reported error is of a second error type;

based at least in part on previously reported errors, determining that errors of the second error type are associated with errors of the first error type; and responsive at least to determining that errors of the second error type are associated with errors of the first error type: identifying a second error, that is (a) of the second error type, (b) associated with the second node, and (c) different than the previously reported error, as a candidate cause of the first error;

in response to a request for information associated with the first error: retrieving information indicating that the second error is the candidate cause of the first error.

12. The medium of claim 11, wherein the operations further comprise:

determining a second previously reported error corresponding to a third node of the set of nodes;

determining that the second previously reported error is of a third error type;

determining that errors of the third error type are not associated with errors of the first error type; and responsive to determining that errors of the third error type are not associated with errors of the first error type: not identifying a third error, of the third error type, associated with the third node as the candidate cause of the first error.

13. The medium of claim 11, wherein determining that errors of the second error type are associated with errors of the first error type comprises determining that errors of the second error type have a tendency to cause errors of the first error type.

14. The medium of claim 11, wherein identifying the set of nodes, from the plurality of nodes, associated with the first node comprises traversing a topology graph associated with the first node.

15. The medium of claim 11, wherein identifying the set of nodes, from the plurality of nodes, associated with the first node is based on a set of rules associated with the first node.

16. The medium of claim 11, wherein the first error is identified during performance of a periodic check of the first node.

17. The medium of claim 11, wherein the previously reported error corresponding to the second node is reported by a diagnostic rule associated with the second node.

18. The medium of claim 11, wherein identifying the second error as the candidate cause of the first error is further in response to:

determining that the second error is currently found on the second node.

19. The medium of claim 11, wherein the operations further comprise:

refraining from executing a diagnostic rule that was previously applied and did not result in identification of any previously reported errors of an error type that is associated with the first error type.

20. A non-transitory computer readable medium comprising instructions which, when executed by one or more hardware processors, causes performance of operations comprising:

determining a trend associated with a metric on a first node of a set of nodes;

based on the trend, predicting a future value of the metric;

determining that the future value of the metric would constitute a first error;

determining a first error type of the first error;

determining that a second error of the first error type was previously found to be a candidate cause of a third error of a second error type on a second node of the set of nodes; and responsive to (a) determining that the future value of the metric would constitute the first error of the first error type and (b) determining that the second error of the first error type was previously found to be the candidate cause of the third error of the second error type: predicting that a fourth error of the second error type will occur on the second node;

in response to a request for information associated with any error on the set of nodes: retrieving information indicating that the fourth error of the second error type is predicted to occur on the second node.

21. A method, comprising:

identifying a first error, of a first error type, associated with a first node;

determining a second node, from a plurality of nodes, such that:

(a) the second node is functionally associated with the first node;

(b) one or more values of a particular metric for the second node are available;

(c) a separately stored candidate analytical mapping maps the particular metric to the first error type;

responsive to the determining operation: analyzing the second node to determine a second error associated with the second node, wherein the second error corresponds to another metric different than the particular metric; and identifying the second error associated with the second node as a candidate cause of the first error;

in response to a request for information associated with the first error: retrieving information indicating that the second error is the candidate cause of the first error;

wherein the method is performed by at least one device including a hardware processor.

22. The method of claim 21, wherein the separately stored candidate analytic mapping maps the particular metric to the first error type conditional upon a range of values for the particular metric.

23. The method of claim 21, further comprising:

determining that the separately stored candidate analytical mapping does not map any metric that is available for a third node to the first error type; and refraining from analyzing the third node to determine a third error associated with the third node.

24. The method of claim 21, wherein analyzing the second node comprises executing a diagnostic rule associated with the second node that identifies the second error.

25. The method of claim 21, further comprising:

prior to determining the second node from the plurality of nodes:

determining that the first node is in communication with each of a set of nodes, from the plurality of nodes, during a period of time associated with the first error; and determining that the set of nodes is functionally associated with the first node, the set of nodes including the second node.

26. The method of claim 21, further comprising:

prior to determining the second node from the plurality of nodes:

determining that a set of nodes, from the plurality of nodes, is functionally associated with the first node based on a topology graph, wherein the set of nodes includes the second node.

27. The method of claim 21, further comprising:
prior to determining the second node from the plurality of nodes:
determining that a set of nodes, from the plurality of nodes, is functionally associated with the first node based on a set of rules associated with the first node, wherein the set of nodes includes the second node.

28. The method of claim 21, further comprising presenting or executing a task to correct the first error based on the second error.

29. The method of claim 21, wherein the first error is identified during performance of a periodic check of the first node.

30. The method of claim 21, wherein the particular metric for the second node is monitored by a background process.

31. A method, comprising:
identifying a first error, of a first error type, associated with a first node;
identifying a set of nodes, from a plurality of nodes, functionally associated with the first node;
determining a previously reported error corresponding to a second node of the set of nodes;
determining that the previously reported error is of a second error type;
based at least in part on previously reported errors, determining that errors of the second error type are associated with errors of the first error type; and
responsive at least to determining that errors of the second error type are associated with errors of the first error type: identifying a second error, that is (a) of the second error type, (b) associated with the second node, and (c) different than the previously reported error, as a candidate cause of the first error;
in response to a request for information associated with the first error: retrieving information indicating that the second error is the candidate cause of the first error;
wherein the method is performed by at least one device including a hardware processor.

32. The method of claim 31, further comprising:
determining a second previously reported error corresponding to a third node of the set of nodes;
determining that the second previously reported error is of a third error type;
determining that errors of the third error type are not associated with errors of the first error type; and
responsive to determining that errors of the third error type are not associated with errors of the first error type:
not identifying a third error, of the third error type, associated with the third node as the candidate cause of the first error.

33. The method of claim 31, wherein determining that errors of the second error type are associated with errors of the first error type comprises determining that errors of the second error type have a tendency to cause errors of the first error type.

34. The method of claim 31, wherein identifying the set of nodes, from the plurality of nodes, associated with the first node comprises traversing a topology graph associated with the first node.

35. The method of claim 31, wherein identifying the set of nodes, from the plurality of nodes, associated with the first node is based on a set of rules associated with the first node.

36. The method of claim 31, wherein the first error is identified during performance of a periodic check of the first node.

37. The method of claim 31, wherein the previously reported error corresponding to the second node is reported by a diagnostic rule associated with the second node.

38. The method of claim 31, wherein identifying the second error as the candidate cause of the first error is further in response to:
determining that the second error is currently found on the second node.

39. The method of claim 31, further comprising:
refraining from executing a diagnostic rule that was previously applied and did not result in identification of any previously reported errors of an error type that is associated with the first error type.

40. A method, comprising:
determining a trend associated with a metric on a first node of a set of nodes;
based on the trend, predicting a future value of the metric;
determining that the future value of the metric would constitute a first error;
determining a first error type of the first error;
determining that a second error of the first error type was previously found to be a candidate cause of a third error of a second error type on a second node of the set of nodes; and
responsive to (a) determining that the future value of the metric would constitute the first error of the first error type and (b) determining that the second error of the first error type was previously found to be the candidate cause of the third error of the second error type: predicting that a fourth error of the second error type will occur on the second node;
in response to a request for information associated with any error on the set of nodes: retrieving information indicating that the fourth error of the second error type is predicted to occur on the second node;
wherein the method is performed by at least one device including a hardware processor.

* * * * *